Figure 1:
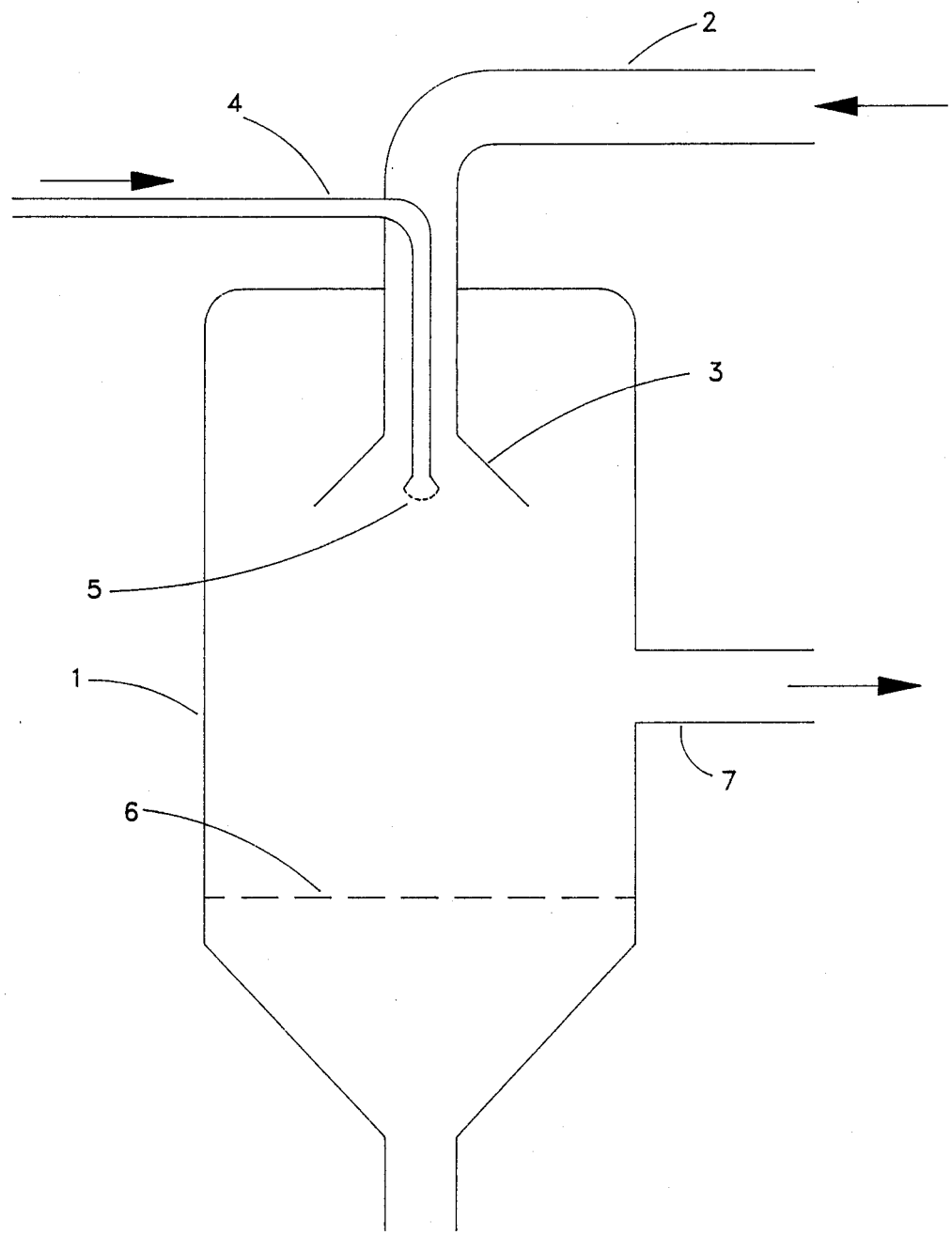

United States Patent [19]

Biagini et al.

[11] Patent Number: 4,915,741
[45] Date of Patent: Apr. 10, 1990

[54] CEMENTITIOUS MIXES

[75] Inventors: Stefano Biagini; Mario Collepardi, both of Treviso, Italy

[73] Assignee: Sandoz Ltd., Basle, Switzerland

[21] Appl. No.: 927,553

[22] Filed: Nov. 5, 1986

[30] Foreign Application Priority Data

Nov. 8, 1985 [IT] Italy .................. 48760 A/85

[51] Int. Cl.[4] ............................. C04B 24/20
[52] U.S. Cl. ..................... 106/314; 106/90; 106/109; 106/111; 106/315
[58] Field of Search ............... 106/314, 315, 90, 104, 106/109, 111

[56] References Cited

U.S. PATENT DOCUMENTS

| | | | |
|---|---|---|---|
| 1,762,241 | 6/1930 | Pontoppidan | 241/15 |
| 1,976,133 | 10/1934 | Larmonr et al. | 106/102 |
| 2,141,571 | 11/1935 | Kennedy et al. | 106/90 |
| 3,765,916 | 10/1973 | Berthier | 106/102 |
| 3,856,542 | 12/1974 | Aignesberger et al. | 106/102 |
| 4,473,406 | 9/1984 | Bradley | 106/90 |
| 4,482,385 | 11/1984 | Satkowski et al. | 106/97 |
| 4,488,909 | 12/1984 | Galer et al. | 106/89 |
| 4,504,320 | 3/1985 | Rizer et al. | 106/98 |
| 4,505,753 | 3/1985 | Scheetz et al. | 106/90 |
| 4,515,861 | 5/1985 | Arup | 428/450 |
| 4,588,443 | 5/1986 | Bache | 106/97 |
| 4,623,682 | 11/1986 | Nicholson et al. | 524/3 |
| 4,636,345 | 1/1987 | Jensen et al. | 264/122 |

FOREIGN PATENT DOCUMENTS

| | | |
|---|---|---|
| 902596 | 6/1985 | Belgium . |
| 677597 | 6/1939 | Fed. Rep. of Germany . |
| 708617 | 7/1941 | Fed. Rep. of Germany . |
| 1469273 | 4/1987 | United Kingdom . |

OTHER PUBLICATIONS

Sprung, S., Einfluss der Mühlenatmosphäre auf das Erstarren und die Festigkeit von Zement, Zement-Kalk-Gips 5, 1974, pp. 259–267.
Cooling Procedures during Finish Grinding, DUDA Cement-Data—Book, pp. 155 and 420.

Primary Examiner—Mark L. Bell
Assistant Examiner—Anthony J. Green
Attorney, Agent, or Firm—Gerald D. Sharkin; Robert S. Honor; Walter F. Jewell

[57] ABSTRACT

The fluidizing or water-retention effect of plasticizers and superplasticizers in cement is increased when the cement has been treated with water before the mixing step, so that it retains from 0.1 to 10% by weight of water.

6 Claims, 2 Drawing Sheets

CEMENTITIOUS MIXES

This invention relates to cementitious mixes containing fluidifying agents, that is, plasticizing or superplasticizing agents.

Plasticizing or superplasticizing agents are chemical additives which are advantageously used in a mortar or concrete in order to increase the fluidity of the fresh cement mix with the same water/cement ratio and so to improve the workability of the mix and its ease of placing. Alternatively the same additives can be used as water reducers to allow the same degree of workability to be maintained while the water/cement ratio is decreased, thereby improving all the properties of the hardened mortar or concrete.

According to ASTM standards, superplasticizers must be capable of reducing mixing water by at least 12% for the same fluidity, whereas plasticizers are capable of reducing mixing water by at least 5%. These additives may be added to the mixing water when the fresh concrete or mortar mix is produced, or may be added to the cement during its production, so that they are present in dry form in the dry cement.

It has now been surprizingly found that the fluidifying or water-retention effect of plasticizers and superplasticizers is increased when the cement has been subject to humidification before mixing.

Accordingly, the present invention provides a process for the production of a cementitious mix comprising the step of mixing together a hydraulic binder, aggregate and water in the presence of at least one additive selected from plasticizers and superplasticizers, characterised in that the hydraulic binder is treated with water before the mixing step, so that it retains from 0.1 to 10% by weight of water.

Preferred cementitious mixes are mortars and concretes. The hydraulic binder may be Portland cement, alumina cement or blended cement, for example pozzolanic cement, slag cement or other types, Portland cement being preferred. A further preferred binder is a pozzolanic cement formed by grinding clinker and calcium sulphate together with bottom ash from coal-fired power stations. Preferably the bottom ash, which is quenched in water, and normally has a water content of about 20–30% wt., is dried to a water content of less than 12%, more preferably 4–7% wt., before grinding. Preferably the bottom ash contains more than 1% wt. of unburned carbon, and less than 1% wt. of sulphates.

Suitable plasticizers include products based upon gluconates, lignosulphonates and hydroxylated polymers, while suitable superplasticizers include condensation products based upon naphthalene sulphonate or melamine sulphonate and formaldehyde, polystyrene sulphonates and hydroxyacrylates. Preferably, the mix contains at least one superplasticizer, more preferably a condensate based on beta-naphthalene sulphonate, particularly in calcium salt form.

Further admixtures such as are conventional in cement technology, for example, set accelerators or retarders, air-entraining agents, frost protection agents, pigments, etc. may also be present in the cementitious mixes produced according to the invention.

The fluidifying agent (plasticizer or superplasticizer) may be added to the mix with the mixing water, or may be present in the humidified cement before mixing. The present invention further provides a hydraulic binder containing at least one additive selected from plasticizers and superplasticizers, and containing from 0.1 to 10% weight of absorbed water. Preferably the quantity of fluidifying agent present in the cement is from 0.1 to 1%, more preferably 0.2 to 0.5% dry weight based on the weight of the cement.

Such a binder may be humidified before the addition of the fluidifying agent, or a binder already containing fluidifying agent may be subject to humidification. Alternatively, the binder may be humidified with an aqueous solution of the fluidifying agent so that humidification and addition of fluidifying agent are simultaneous.

Humidification of the hydraulic binder or cement is carried out by subjecting the cement, preferably after the grinding step, to water in liquid, aerosol or vapour form so that the water is homogeneously absorbed in an amount from 0.1 to 10% of the weight of the cement, preferably 0.5 to 5% by weight, more preferably 0.5–2% by weight. These weight percentages represent the weight of water adsorbed, not the weight applied. Preferably water is added in the form of a fine liquid spray to cement either immediately after the grinding process or after a certain period of time.

A suitable apparatus for carrying out the water treatment step is shown in diagrammatic form in FIG. 1. Cement is fed into a vessel 1 through a feed pipe 2 leading to a conical vent 3. A feed pipe 4 of smaller diameter than 2 leads to a spray nozzle 5 through which is pumped water or an aqueous solution of the fluidifying agent. A stream of air is blown through the perforated base 6 of the vessel; this mixes the moistened cement and carries it out through the discharge pipe 7.

It is known that dry cement containing fluidifying agents may be obtained by spraying the cement during the grinding phase with an aqueous solution of the agent, as described for example in U.S. Pat. Nos. 2,141,571 and 3,856,542. However, as described in these patents, the cement is at a temperature at which the water is rapidly evaporated, leaving the dry fluidifying agent deposited on the cement particles, but not adding to the water content of the finished product.

It is possible to carry out the process of this invention by adding water during the grinding process in an amount or at a temperature such that some water remains in the finished product, but because of the difficulty of controlling the amount of water absorbed, it is preferred to humidify the cement after grinding.

The optimum amount of water present will vary with the chemical composition and the fineness of the cement, finely ground cement generally requiring rather more water than coarsely ground.

Figure 2:
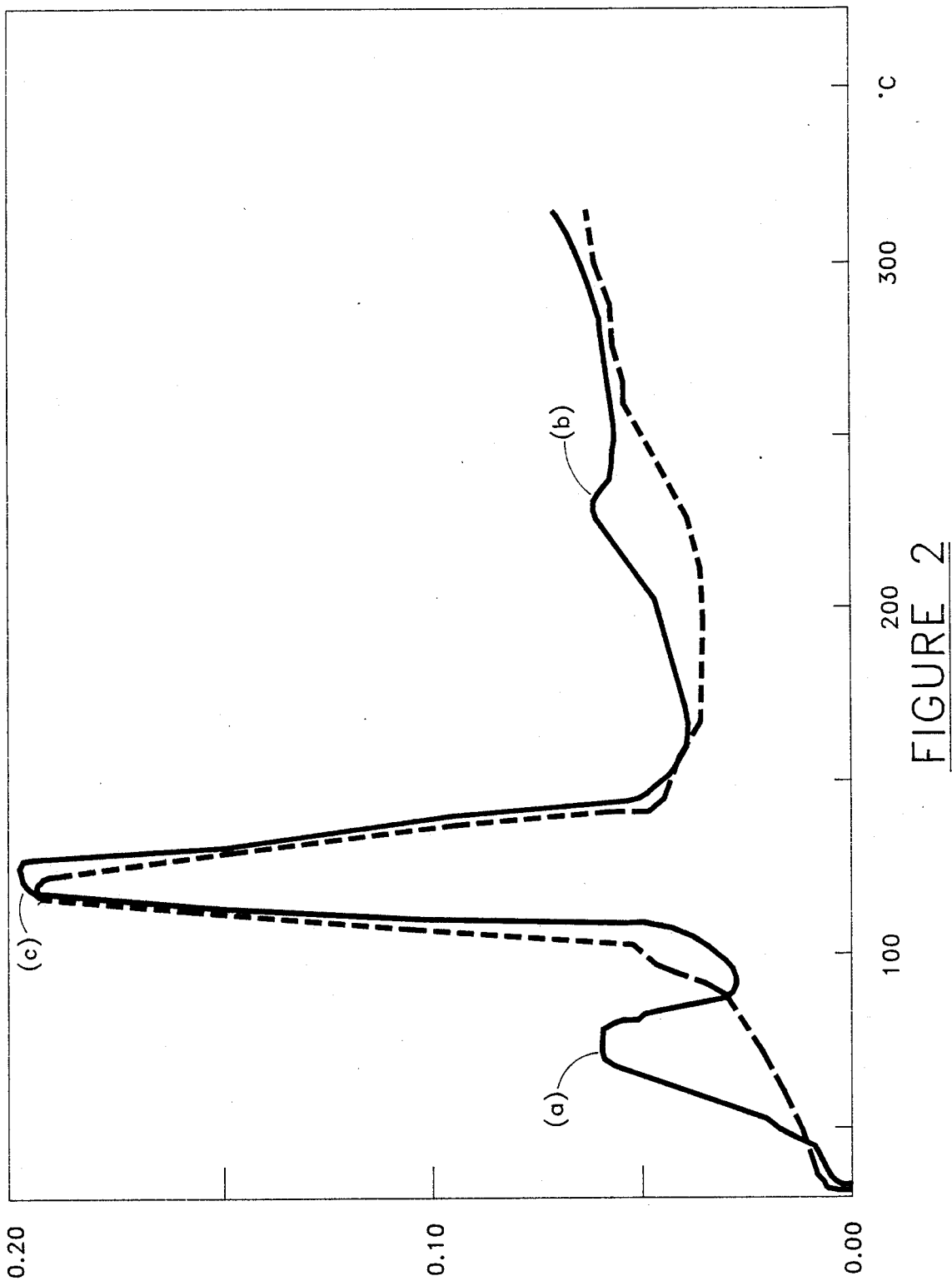

The water is principally absorbed in the form of the hydrated minerals ettringite ($3CaO.Al_2O_3.3CaSO_4.31H_2O$) and/or monosulphate ($3CaO.Al_2O_3.CaSO_4.16H_2O$) on the surface of the cement particles, in such amounts that they can be detected by differential scanning calorimetry (DSC), differential thermogravimetry (DTG) or differential thermal analysis (DTA) techniques. FIG. 2 shows DSC scans obtained from two samples of cement, both containing 0.4% dry weight of superplasticizer, but with one having no water treatment, designated by the broken line curve, and the other being treated with 1% wt. water, designated by the solid line curve. Peaks due to the loss of water from ettringite (Peak a) and monosulphate (Peak b) can clearly be seen on the scan of the water-treated sample. Peak (c) is the peak due to the loss of water from gypsum.

A cementitious mix prepared according to the present invention gives an excellent combination of workability of the mix and strength properties of the resulting hardened concrete or mortar, for example manufactured articles of concrete. This result is particularly surprizing since it is generally believed that water absorption by cement is undesirable and has negative effects on the strength of the resulting concrete (see for example S. Sprung "Einfluss der Mühlenatmosphäre auf das Erstarren und die Festigkeit von Zement" in *Zement-Kalk-Gips* 5 259-267 (1974) and W. H. Duda "Cement data-book" Bauverlag GmbH, Wiesbaden and Berlin pp 155, note).

The following Examples, in which all parts, ratios and percentages are by weight, illustrate the invention:

EXAMPLE 1

Six mortar mixes were prepared, each containing 1 part high strength Portland cement and 3 parts sand and with a water/cement ratio of 0.45. Each contained 0.4% dry weight (1% of a 40% aqueous solution) based on the weight of cement, of a superplasticizing additive based on a calcium beta-naphthalene sulphonate condensation product with formaldehyde. Two mortar mixes were made from each of three different commercial high strength Portland cements. In each case one mix was made from cement as delivered, and one mix was made from cement treated with 1% water. For each mortar, the fluidity of the fresh mix was measured by the flow table test according to UNI 7044, and the compressive strength was measured after 1 day, 7 days and 28 days. Table 1 shows the average values for the three different cements.

TABLE 1

| Cement | Flow Table % | Compressive Strength (MPa) | | |
|---|---|---|---|---|
| | | 1 day | 7 days | 28 days |
| no treatment | 120 | 303 | 515 | 632 |
| + 1% water | 160 | 301 | 536 | 643 |

The cements treated according to the present invention produced in the presence of superplasticizer mortars having fluidity substantially higher than from the untreated cements, and with equal or slightly superior compressive strength.

EXAMPLE 2

Two mortars were made having the same proportions of the same ingredients as in Example 1, but instead of adding the superplasticizer separately, a cement was used in which 0.4% of the same superplasticizer had been incorporated during the production process. For one mortar, the cement was used as received, for the other, the cement was treated with 1% water. The results of flow table and compressive strength tests on the two mortars are shown in Table 2.

TABLE 2

| Cement | Treatment with water (1%) | Flow Table (%) (UNI 7044) | Compressive Strength (MPa) | | |
|---|---|---|---|---|---|
| | | | 1 day | 7 days | 28 days |
| 1 | NO | 120 | 38.9 | 60.8 | 73.1 |
| 2 | YES | 155 | 40.6 | 67.8 | 77.5 |

As in Example 1, the results show considerable improvement in fluidity with a slight improvement of compressive strength.

EXAMPLE 3

Four mortars were prepared, each containing 1 part high strength Portland cement and 3 parts sand, and having a water/cement ratio of 0.50. In two cases the cement had been treated, before mixing, with 0.5% water. Each mortar contained 0.1% dry weight (0.2% of a 50% aqueous solution), based on the weight of cement, of a plasticizing additive which was either calcium lignosulphonate or sodium gluconate. Flow table measurements on the mixes are shown in Table 3

TABLE 3

| Treatment of cement | additive | flow table (%) |
|---|---|---|
| none | Ca lignosulphonate | 60 |
| 0.5% water | Ca lignosulphonate | 80 |
| none | Na gluconate | 73 |
| 0.5% water | Na gluconate | 95 |

EXAMPLE 4

Eight mortars were prepared, each containing 1 part high strength Portland cement, 3 parts sand and 0.48% dry weight (1.2% of a 40% aqueous solution), based on the weight of cement, of the superplasticizing additive used in Example 1. For seven of the mortars, the cement used in their preparation had been humidified with from 0.05 to 10% of water. The amount of water used in mixing the mortar was adjusted to allow for the water present in the cement, so that the total water/cement ratio was 0.45 in all cases. The fluidity of the resulting mortars is shown in Table 4.

TABLE 4

| Mortar No. | cement humidification (% water) | mixing ratio water/cement | Flow Table (%) |
|---|---|---|---|
| 1 | 0 | 0.4500 | 95 |
| 2 | 0.05 | 0.4495 | 105 |
| 3 | 0.10 | 0.4490 | 110 |
| 4 | 0.50 | 0.4450 | 125 |
| 5 | 1.00 | 0.4400 | 132 |
| 6 | 3.00 | 0.4200 | 132 |
| 7 | 5.00 | 0.4000 | 125 |
| 8 | 10.00 | 0.3500 | 100 |

It is evident that, even considering the humidification water as part of the mixing water, mortars 2-8 prepared according to the present invention have significantly higher fluidity than the control mortar No. 1. Humidification with 0.5-5% water is seen to give particularly good results.

EXAMPLE 5

Six mortars were prepared, each containing 1 part cement, 3 parts sand and 0.48% dry weight (1.2% of 40% aqueous solution), based on the weight of cement, of the superplasticizing additive used in Example 1, and having a water/cement ratio of 0.45. Three different types of cement were used (a) pozzolan cement (with natural pozzolan)
(b) slag cement
(c) pozzolan cement (with fly ash)
(d) pozzolan cement (with bottom ash) the bottom ash originally contained 25% water, and was dried to 5% water.

Each cement was used either as received or after humidification with 1% water. The results of fluidity tests are shown in Table 5.

TABLE 5

| Mortar No. | cement type | cement treatment | flow table (%) |
|---|---|---|---|
| 1 | natural pozzolan | none | 90 |
| 2 | natural pozzolan | 1% water | 110 |
| 3 | slag | none | 107 |
| 4 | slag | 1% water | 125 |
| 5 | fly ash pozzolan | none | 65 |
| 6 | fly ash pozzolan | 1% water | 85 |
| 7 | bottom ash pozzolan | none | 120 |
| 8 | bottom ash pozzolan | 1% water | 170 |

It is apparent that the improved fluidification is also found for cements other than Portland cement.

EXAMPLE 6

Four mortars were prepared, each containing 1 part high strength Portland cement and 3 parts sand and having a total water/cement ratio of 0.45. Each contained 0.4% (1% of a 40% aqueous solution) of the superplasticizer of Example 1, but this was added at different stages, as shown below
(1) Superplasticizer added to mixing water. Cement not humidified.
(2) Superplasticizer added during manufacturing process. Dry cement+superplasticizer not humidified.
(3) Cement after grinding humidified with 1% of the 40% superplasticizer solution.
(4) Cement after grinding humidified with 2% of a solution obtained by mixing the 40% superplasticizer solution with an equal volume of water.

Mortars (3) and (4) are thus prepared according to the present invention, and mortars (1) and (2) are controls.

Table 6 shows the fluidity properties of the resulting mortars.

TABLE 6

| Mortar No. | addition of superplasticizer | water treatment (%) | flow table (%) |
|---|---|---|---|
| 1 | to mixing water | — | 110 |
| 2 | during grinding | — | 105 |
| 3 | after grinding | 1 | 120 |
| 4 | after grinding | 2 | 125 |

EXAMPLE 7

Two concretes were prepared using a Portland cement which was treated during its grinding process in the cement plant with 0.4% dry weight (1% of a 40% aqueous solution) of the superplasticizer of Example 1. In one case the cement was used as received, in the other case it was humidified with 1% water. Both concrete mixes contained 400 kg/m³ cement, the same amount of the same aggregate (max. size 20 mm), and were mixed with water to the same consistency (220 mm±10 mm slump).

Table 7 shows the water content required to give this slump, and the compressive strength of the resulting concretes.

TABLE 7

| Test No. | Treatment according to the invention | W/C ratio | slump mm | compressive strength (MPa) | | |
|---|---|---|---|---|---|---|
| | | | | 1 day | 7 days | 28 days |
| 1 | NO | 0.45 | 220 | 37.0 | 62.5 | 72.5 |
| 2 | YES | 0.41 | 225 | 46.5 | 74.0 | 82.0 |

It will be seen that the water-reducing effect of the superplasticizer is enhanced by the treatment of the cement according to the invention.

What is claimed is:

1. A process for the production of cementitious mix comprising the step of mixing together a hydraulic binder, aggregate and water in the presence of a least one additive selected from plasticizers and superplasticizers, characterized in that the hydraulic binder is treated with water before the mixing step and separately from the addition of plasticizer or superplasticizer, so that it retains from 0.1 to 10% by weight of water.

2. A process according to claim 1 in which the plasticizer or superplasticizer is added to the mixing water.

3. A process according to claim 1 in which the plasticizer or superplasticizer is present in the dry hydraulic binder before the water treatment and before mixing.

4. A process according to claim 1 in which the water treatment step is carried out after the grinding of the hydraulic binder.

5. A process according to claim 1, in which the superplasticizer is a formaldehyde condensate of a sulphonated aromatic compound.

6. A process according to claim 5 in which the superplasticizer is a calcium salt of a beta-naphthalane sulphonic acid/formaldehyde condensate.

* * * * *